United States Patent
Sopper et al.

(10) Patent No.: US 11,463,867 B2
(45) Date of Patent: Oct. 4, 2022

(54) METHOD FOR TRANSMITTING INFORMATION

(71) Applicant: Cyberschmiede GmbH, Füssen (DE)

(72) Inventors: Roland Sopper, Stuttgart (DE); Joachim Benjamin Sahler, Stuttgart (DE); Manfred Rietzler, Bangkok (TH)

(73) Assignee: CYBERSCHMIEDE GMBH, Fussen (DE)

( * ) Notice: Subject to any disclaimer, the term of this patent is extended or adjusted under 35 U.S.C. 154(b) by 0 days.

(21) Appl. No.: 17/215,092

(22) Filed: Mar. 29, 2021

(65) Prior Publication Data
US 2021/0314764 A1    Oct. 7, 2021

(30) Foreign Application Priority Data
Apr. 2, 2020  (DE) ..................... 10 2020 109 223.7

(51) Int. Cl.
| | |
|---|---|
| *H04W 24/00* | (2009.01) |
| *H04W 8/20* | (2009.01) |
| *H04W 4/029* | (2018.01) |
| *H04W 4/02* | (2018.01) |
| *H04L 67/50* | (2022.01) |

(52) U.S. Cl.
CPC ........... *H04W 8/205* (2013.01); *H04L 67/535* (2022.05); *H04W 4/023* (2013.01); *H04W 4/029* (2018.02)

(58) Field of Classification Search
CPC ..... H04W 8/205; H04W 4/029; H04W 4/023; H04L 6/22
See application file for complete search history.

(56) References Cited

U.S. PATENT DOCUMENTS

| | | | |
|---|---|---|---|
| 10,594,816 B2 * | 3/2020 | Mottur | .................. H04W 4/029 |
| 2007/0242131 A1 | 10/2007 | Sanz-Pastor et al. | |
| 2011/0159890 A1 | 6/2011 | Fortescue et al. | |
| 2011/0161427 A1 | 6/2011 | Fortin et al. | |
| 2012/0143963 A1 | 6/2012 | Kennberg et al. | |
| 2017/0332200 A1 * | 11/2017 | Kaiman | .................. H04W 4/14 |

FOREIGN PATENT DOCUMENTS

WO    WO-03107541 A2 * 12/2003 ............. H04L 67/18

* cited by examiner

*Primary Examiner* — Erika A Washington
(74) *Attorney, Agent, or Firm* — Dickinson Wright PLLC; Andrew D. Dorisio

(57) ABSTRACT

The invention relates to a method for transmitting information between a plurality of mobile devices which are disposed in a shared network and which are connected to each other via a network server device, wherein a data set transfer from at least two transmitting mobile devices to the network server device takes place, the transferred data sets being data sets individually generated on the transmitting mobile devices, and subsequently a data set transfer from the network server device to at least one receiving mobile device takes place, wherein for forming an output data set sequence for the display of the data sets or the news posts on the receiving mobile device, the sequence of the data sets is changed depending on the relative position of the transmitting mobile devices to the receiving mobile device.

4 Claims, No Drawings

METHOD FOR TRANSMITTING INFORMATION

This application claims priority to German Patent Application No. 10 2020 109 223.7 filed on Apr. 2, 2020, which is incorporated herein by reference.

FIELD OF THE INVENTION

The present invention relates to a method for transmitting information between a plurality of mobile devices which are disposed in a shared network and which are connected to each other via a network server device, wherein a data set transfer from at least two transmitting mobile devices to the network server device takes place, the transferred data sets being data sets individually generated on the transmitting mobile devices, and subsequently a data set transfer from the network server device to at least one receiving mobile device takes place, wherein, in addition to a news post, the data sets comprise the position data of the transmitting mobile device as a first data set attribute and a time specification which is assigned to the news post as a second data set attribute, and the data sets in the network server device form an access data set sequence depending on the time specification, wherein the access data set sequence is processed in a data processing device of the network server device or in a data processing device which is connected to the network server device, such that for forming an output data set sequence for the display of the data sets or the news posts on the receiving mobile device, the sequence of the data sets is changed and/or a selection of the data sets takes place depending on the relative position of the transmitting mobile devices to the receiving mobile device.

BACKGROUND OF THE INVENTION

Methods for transmitting information between a plurality of users that are disposed in a shared network and that are connected to each other via a network server device, wherein mobile devices are in particular used for communication between the users, are known in many forms of appearance. Information, in particular in the form of private posts, is regularly posted in the user community via the known social networks, wherein the users are able to define personal filters such that these users are able to limit the amount of information posted to the network regarding information which is generally considered relevant due to its contents.

However, due to the virtual community being geographically distributed in an unlimited manner, which is made possible by the internet and which leads to users of the social network, i.e. members of this virtual community, being part of the network completely irrespective of their local mapping, for the user, this still results in an excessive amount of information which is superfluous as an information source because of its sheer local or regional irrelevance and thus causes a useless amount of data for the user.

SUMMARY

The object of the present invention is to propose a method for transmitting information between a plurality of mobile devices which are disposed in a shared network and which are connected to each other via a network server device, said method allowing an increased information relevance for the user.

According to the invention, a data set transfer from at least two transmitting mobile devices to the network server device takes place, the transferred data sets being data sets individually generated on the transmitting mobile devices, and subsequently a data set transfer from the network server device to at least one receiving mobile device takes place, wherein, in addition to a news post, the data sets comprise at least the position data of the transmitting mobile device and a time specification which is assigned to the news post and the data sets in the network server device form an access data set sequence depending on the time specification, wherein the access data set sequence is processed in a data processing device of the network server device or in a data processing device which is connected to the network server device, such that for forming an output data set sequence for the display of the data sets or the news posts on the receiving mobile device, the sequence of the data sets is changed and/or a selection of the data sets takes place depending on the relative position of the transmitting mobile devices to the receiving mobile device.

DETAILED DESCRIPTION

In the method according to the invention, news posts of registered or unregistered users are recorded via the network server device as data sets which are provided with the position data of the transmitting mobile devices and the time specifications regarding the writing of the news posts. To ensure a high topicality of the posts, it is possible to define the data processing device such that the data sets are available for forwarding for only a defined period of time.

The particular advantage of the method according to the invention is that by linking the position data of the transmitting mobile devices to the news posts of the transmitting mobile devices and the known position data of the at least one receiving mobile device, a piece of information regarding the relative position, in particular distance, of the transmitting mobile devices from the at least one receiving mobile device is available which allows the sequence of the data sets, which are sent from the different transmitting mobile devices, in the data processing device to be sorted according to the respective distance between the transmitting mobile device and the receiving mobile device, thus creating a sequence of the data sets in the output data set sequence not according to their access time to the network server device but according to the distance of the transmitting mobile devices from the receiving mobile devices, such that the news posts of the nearer transmitting mobile device can receive the higher priority.

Data sets from transmitting mobile devices which exceed a defined maximum distance between a transmitting mobile device and a receiving mobile device can be removed from the output data set sequence, such that only data sets coming from transmitting mobile devices which are not disposed too far from the receiving mobile device are available in the output data set sequence and that it is ensured that news posts of, for instance, spoken/written text, images or videos, which are created on a transmitting mobile device do bear a corresponding local or regional reference for the receiver.

Equally, it is possible to create a sequence of the data sets according to their topicality in the data processing device, thus using the time specification which is assigned to the news posts as a data set attribute for the sorting of the sequence.

In the context of the present invention, the terms transmitting mobile device and receiving mobile device are to be understood such that the current status of the respective mobile devices which participate in the method is described, meaning that specific mobile devices on which the news post is created and which are in the transmitting status at a specific point in time of the method are termed as transmitting mobile devices, wherein, at a different point in time of the method, the same mobile devices can be in the receiving status and then act as receiving mobile devices.

Preferably, the mobile devices are connected to the network server device by means of an application software via which data sets from the network server device can be requested by the receiving mobile device, wherein at least one data set attribute which is depositable in the data processing device is definable via the respective user of the mobile device, wherein the data processing device comprises an evaluation unit which verifies the conformity of the data sets with the data set attribute. In addition to the position and time specifications already contained in the data sets, it is thus possible to provide additional data set attributes defined via the app by the user, by means of which topics relevant to the user can be defined, for example, such that the amount of the data sets in the output data set sequence can be reduced even further. It is in particular possible to set the number of data set attributes according to the defined maximum distance between the transmitting mobile devices and the respective receiving mobile device such that news posts are increasingly filtered as the distance increases.

For example, it can be determined in this way that data sets from transmitting mobile devices which are located at a distance of less than 1 km from the receiving mobile device generally are part of the output data set sequence and that data sets from transmitting mobile devices which are located at a distance of more than 1 km from the receiving mobile device are only then part of the output data set sequence when an additional data set attribute is present, for example when a news post containing words has a certain key word, which thus acts as a filter criterion for the selection of a data set.

When the application software has an administrator level for an administrator access to the data processing device for defining additional data set attributes, priorities for the sequence of the data sets can be defined irrespective of the user of the receiving mobile device or a mixing ratio between local, regional and supra-regional news posts can be specified. Furthermore, the administrator can thus also implement the setting that push messages are sent via the data set attribute irrespective of a request by the user of the receiving mobile phone.

Preferably, the application software has an interface for a data set transfer with an external transmitting device, in such a manner that external data sets are transmittable from the transmitting device to the data processing device. In this manner, commercial posts, such as advertisements directed at local customers, can be coupled into the output data set sequence by external transmitting devices. Equally, it is possible to integrate official notifications, such as special rules of conduct directed at the users in case of danger.

Particularly preferably, the application software has a device for generating data set attributes depending on the usage pattern of the user of the receiving mobile device. For generating the data set attributes, methods of artificial intelligence can thus be used which, for example, allow varying retrieval time periods effected by the user while their mobile device is in the receiving status to be taken into account when generating the data set attributes, said retrieval time periods differing in length depending on the time of the day. In this manner, for a user who regularly effects only short retrieval time periods in the early morning during which news posts are retrieved from the network server device, the data set attributes can be determined such that regional or supra-regional news posts are prioritized, whereas in the evening, when the user regularly effects longer retrieval time periods, the focus is on transmitting more local news posts.

When the position data of the transmitting mobile device is an optional data set attribute of the data set which is transmitted to the receiving mobile device, the user of the transmitting mobile device can prevent that their personal position data becomes known to the user of the receiving mobile device along with the news post.

Despite the method according to invention being suitable in a particularly preferable manner for use in combination with mobile devices, such as in particular smartphones, the method according to the invention is equally realized when stationary devices, such as personal computers having a suitable interface, are used instead of mobile devices.

The invention claimed is:

1. A method for transmitting information between a plurality of mobile devices which are disposed in a shared network and which are connected to each other via a network server device, wherein a data set transfer from at least two transmitting mobile devices to the network server device takes place, the transferred data sets being data sets individually generated on the transmitting mobile devices, and subsequently a data set transfer from the network server device to at least one receiving mobile device takes place, wherein, in addition to a news post, the data sets comprise the position data of the transmitting mobile device as a first data set attribute and a time specification which is assigned to the news post as a second data set attribute, and the data sets in the network server device form an access data set sequence depending on the time specification which is assigned to the news post, wherein the access data set sequence is processed in a data processing device of the network server device or in a data processing device which is connected to the network server device, such that for forming an output data set sequence for the display of the data sets or the news posts on the receiving mobile device, the sequence of the data sets is changed and/or a selection of the data sets takes place depending on the relative position of the transmitting mobile devices to the receiving mobile device,
  wherein the transmitting mobile devices and the receiving mobile devices are connected to the network server device by means of an application software, wherein at least one additional data set attribute which is depositable in the data processing device is definable via a user of the receiving mobile device,
  wherein the data processing device comprises an evaluation unit which verifies the conformity of the access data sets with the data set attributes, the application software has a device for generating the data set attributes depending on a usage pattern of the user of the receiving mobile device,
  wherein methods of artificial intelligence are used for generating the data set attributes, wherein the usage pattern comprise the length of retrieval time periods depending on the time of the day.

2. The method according to claim 1, characterized in that the application software has an administrator level for an administrator access to the data processing device for defining additional data set attributes.

3. The method according to claim 1, characterized in that the application software has an interface for a data set transfer with an external transmitting device, in such a manner that external data sets are transmittable from the transmitting mobile device to the data processing device.

4. The method according to claim 1, characterized in that the position data of the transmitting mobile device is an optional data set attribute of the data set which is transmitted to the receiving mobile device.

* * * * *